F. L. SMITH.
CENTRIFUGAL SPEED GOVERNOR.
APPLICATION FILED MAR. 16, 1914.
1,167,850. Patented Jan. 11, 1916.
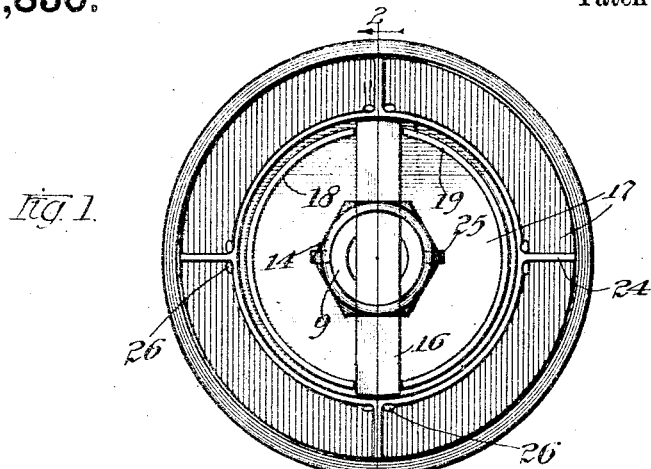
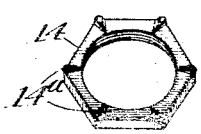
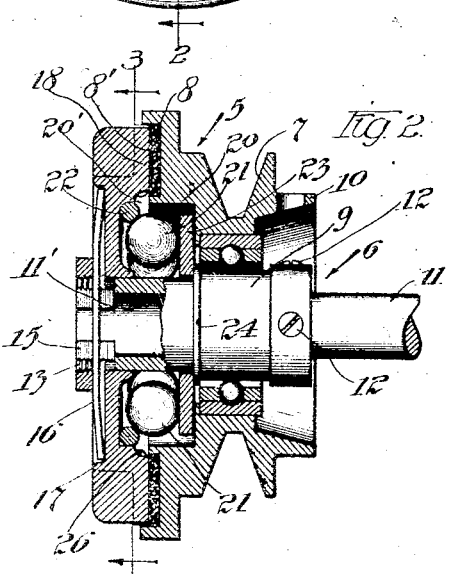
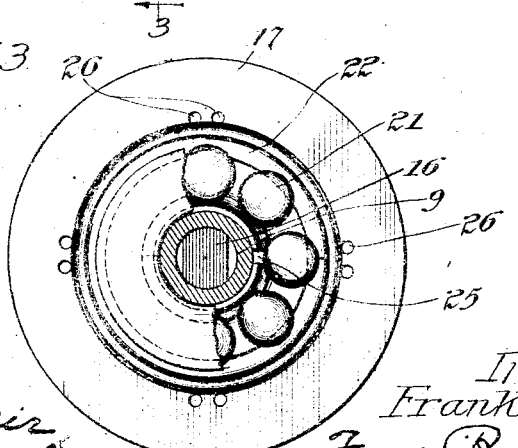
Witnesses:
Inventor
Frank L. Smith,

UNITED STATES PATENT OFFICE.

FRANK L. SMITH, OF WINTHROP, MASSACHUSETTS, ASSIGNOR TO THE APPLE ELECTRIC COMPANY, OF DAYTON, OHIO, A CORPORATION OF OHIO.

CENTRIFUGAL SPEED-GOVERNOR.

1,167,850.  Specification of Letters Patent.  Patented Jan. 11, 1916.

Application filed March 16, 1914. Serial No. 825,094.

*To all whom it may concern:*

Be it known that I, FRANK L. SMITH, a citizen of the United States, residing at Winthrop, in the county of Suffolk and State of Massachusetts, have invented certain new and useful Improvements in Centrifugal Speed-Governors, of which the following is a specification.

My invention relates to improvements in speed governors.

One of the objects of my invention is to provide a sensitive, reliable, simple and cheap-to-construct speed governor, which is devoid of levers and links, having no wearing pivoted joints.

Another object of my invention is to provide a speed controlling governor which will respond instantly to variations of speed, as a result of the practical absence of frictional resistance of the parts, thereby avoiding over regulation, which is superinduced by the internal friction of such devices and which invariably produces "hunting," or undulations of speed, of the machine to be driven.

My improved speed governor is designed to be used in situations wherein an inconstant driving power—the minimum speed of which is as great, or greater, than the maximum speed of the machine to be driven—is employed to drive a machine at a predetermined constant speed, as when a water wheel or variable speed engine is used to drive a constant potential dynamo electric machine, or the like.

The especial use for which my speed governor is particularly well adapted is for maintaining constant speed of an electric lighting dynamo, for an automobile equipment, when the power for the dynamo is to be derived from the vehicle propelling engine, or in train lighting systems wherein power may be taken from the axle of the coach to drive the dynamo.

There are other uses and purposes for which my invention is well adapted which will readily occur, to persons skilled in the art, and which will become manifest from a consideration of the following description when taken in conjunction with the drawings wherein—

Figure 1 is an elevation of the governor, looking toward the machine to be driven. Fig. 2 is a central section, taken on line 2—2 of Fig. 1. Fig. 3 is a transverse section, taken on line 3—3 of Fig. 2. Fig. 4 is an isometric view of the adjusting nut, used for changing the adjustment of the governor.

In all the views the same reference characters are employed to indicate similar parts.

The governor consists of two major portions, the driving part 5 and the part 6 to be driven. The driving part 5 contains a groove 7 for a round driving belt. Of course it is evident that instead of the groove, a sprocket wheel or gear wheel, or other driving means, may be substituted. Secured in a groove 8' on the face of the part 5 is an annular, friction driving surface 8 through which the part 6 is driven. The driven part 6 comprises a sleeve 9, supported in a ball bearing 10, within the hollow portion of the driving member 5, it is hollow for reception of the shaft 11 and is secured thereto as by set screws 12. The sleeve 11 is reduced in diameter at its outer end, as at 13 and screw threaded for reception of an adjusting nut 14. The screw threaded portion 13 is slotted, as at 15, to receive the variable spring 16. Encompassing the sleeve, or hub 9, is a disk 17 having an annular frictional engaging surface 18, adapted to bear against the insertible frictional surface 8, of the driving member 5. The spring 16 presses the two frictionally engaging surfaces together, with more or less tension. The extent of pressure being made adjustable by varying the tension of the spring by means of the nut 14 upon the hollow threaded end 13 of the sleeve 9. The spring 16 consists of a steel bar deflected at its ends and is received between substantially semi-annular ribs 18 and 19 projecting from the member 17, and thereby becomes a driver of the part 17, rotatably connecting the sleeve 9 with the disk 17. The member 5 is counter-bored to provide a recess 20 and the member 17 is similarly counterbored to provide a recess 20'. Within the two part chamber thus provided, when the two members 5 and 17 are in the position shown in Fig. 2, a plurality of centrifugally actuated rolling wedge members such as steel balls 21, are included. A hardened steel ring, 22, made of ordinary steel wire, is placed in the chamber 20', of the member 17, upon the surface of which the rolling wedge members, or balls 21, ride when they are thrown outwardly by the effect of centrifugal motion. The centrifugally impelled balls 21, find opposite bearing on a loose washer 23, that surrounds the sleeve 9 and abuts against the annular ridge 24 formed on the sleeve 9 the balls thus being retained between two substantially relatively stationary parts. The member 17 is provided, at intervals, with radial ribs 24, thus to provide radiating surfaces for the dissipation of heat that may be evolved by the relative frictional slip between the members 5 and 17. As a further means for dissipating and carrying off the heat I provide apertures 25, through the wall of the member 17, near the sleeve 9, through which air will pass when the device is rotated rapidly, into the ball chamber 20' and from which the air will pass, through apertures 26 that are located farther from the axis of the member 17 and near to the extreme radial limit of said chamber. These means of cooling the parts may not in all cases be necessary but they contribute to the constancy of operation of the device and prevent rapid deterioration when the parts thereof are maintained at substantially uniform temperature.

The operation of the device is substantially as follows: When the driving part 5 is rotated, by any suitable power transmitting means, its frictional engagement with the driven member 17, through the friction surface 8 and the surface 18 causes the latter to be rotated, owing to the pressure produced by the spring 16, axially moving the disk 17 on the sleeve 9, causing these surfaces to be pressed firmly into contact. As the spring 16 has rotary engagement with the sleeve, 9, as by the slot 15, the sleeve is rotated thereby, it being understood of course that the spring 16 rests in spaces intervening between the driving ribs 18 and 19 of the member 17, so that it operates as a positive drive, connecting the parts 9 and 17 together.

When the rotative speed of the device has reached a predetermined velocity the rolling wedge members, in the present instance exemplified by hardened steel balls 21, will be thrown outwardly in a substantial radial or tangential plane and then, when making contact with the steel ring 22, will force the parts 5 and 17 apart, to a greater or less extent, against the resilient action of the spring 16, so that the friction surfaces 8 and 18 will not be forced together, to the same extent that they were initially, and therefore there will be some rotary slip between the members 5 and 17. The excessive speed of the member 5, being represented by the extent of slip between the frictional engaging parts. The greater the velocity, the more forcibly will the balls 21 be wedged between the bearing ring 22 and the washer 23 and to a substantially corresponding degree will the driving frictional engagement of the parts be decreased. When the balls 21 are outwardly projected, in the manner described, they force the member 17 away from the disk 23 thereby providing a practically frictionless bearing, between said members, so that the range of ineffective operation, or lag of response, due to the friction of the parts is, practically, thus eliminated, and over governing and under governing is substantially avoided.

When the balls are projected outwardly, by an increase of speed, they must be so arranged that they will be returned by some means, in this case the return is effected automatically as the result of the pressure of the spring 16, which forces them out of their location of interposition between the driving and driven member. This is accomplished by each ball contacting with the surfaces against which they are wedged on one side of a diametric line through the ball, otherwise, when the centrifugal effect would cause the balls to be projected outwardly to force the contacting parts apart, they would remain in the positions to which they had been forced by the increase of speed, and would not be returned, upon the cessation of such increase of speed.

What I mean by a range of inactivity is that in governors of this general type, wherein friction is present to such an extent as to be highly objectionable, the speed responsive mechanism does not act at the actual critical change of speed, but its operation is delayed until the speed has increased beyond the point at which it should have been changed and therefore the velocity is then so great that the governor over governs, so to speak, and thereby reduces the speed of the driven member to a greater extent than required, the friction of the parts again operating to delay the governing effect of the device to increase the speed of the driven member thereby producing a "hunting effect" or undulatory motion, instead of a constant motion of the driven member.

When the speed at which the driven member is to be maintained constant, is to be increased, adjustment may be effected to accomplish this result by turning the nut 14, on the hollow sleeve 9, to increase the tension of the spring 16. The projections 14ᵃ, from the nut 14, are sufficiently wide apart to include the spring 16 between any two of them and thereby the nut 14 is held against unintentional rotary displacement. As shown, the nut 14 may be rotated and fixed at each one sixth of a revolution on the screw. The threads 13, of the sleeve 9, may be made as fine or as coarse as desired so as to effect a greater or less axial movement of the spring 16 at a given rotary movement of the nut 14.

While I have herein shown a single embodiment of my invention, for the purpose of clear disclosure, it is manifest that changes may be made in the structure within the scope of the appended claims.

Having described my invention, what I claim is:—

1. A speed governor comprising rotatable driving and driven members; a yielding means for forcing said members into frictional driving engagement, and centrifugally actuated, rolling, wedge members contacting with one of said members only and rotatively carried thereby, actuating under speed to tend to force said members out of their driving frictional engagement.

2. A governor comprising rotatable driving and driven members; a yielding means for forcing said members into frictional driving engagement and a plurality of centrifugally actuated balls rotatively carried by one of said members, acting under speed to tend to force said members out of their frictional engagement and means to automatically return the said balls out of their forcible contact with said members upon the decrease of speed.

3. A speed governor comprising rotatable driving and driven elements, a yielding means for forcing said elements into frictional driving engagement, a pair of members carried by one of the elements freely movable axially relatively to each other, and a plurality of centrifugally actuated balls rotatably carried between said members, acting under increased speed to move radially outwardly into contact with said members thereby tending to force the element on which said members are carried out of driving frictional engagement with the other element and permitting said yielding means to return them to position out of operative contact with said members upon decrease of speed.

4. A speed governor comprising a rotatable driving and a driven disk, said disks having coöperative frictional driving surfaces and each provided with an axially concentric recess to jointly provide a chamber for centrifugally actuated, separating members; means for yieldingly forcing said surfaces into frictional driving engagement; means within said chamber, adapted to exert a separating pressure upon said disks when centrifugally actuated, and means for forcing a current through the said chamber when the governor is rotated, to cool the parts.

5. A speed governor comprising a driving and a driven member; a yielding member for forcing said members into frictional driving engagement, and centrifugally actuated, rolling, wedge members contacting only with the driven member and rotatively carried thereby, acting under speed to tend to force the driven member out of engagement with the driving member.

6. A speed governor comprising rotatable driving and driven members, one of which is axially movable, resilient means for forcing said members in frictional driving engagement, an axially fixed abutment rotatively associated with the axially movable member, and centrifugally actuated rolling wedge members interposed between the abutment and axially movable member, acting under speeds to tend to disengage said members.

7. A speed governor comprising a driving shaft, a driven member rotatably carried thereby, a clutch member axially movable on the driving shaft, the end of said shaft being diametrically slotted, a leaf spring positioned in said slot with its ends bearing against the clutch member to normally hold the same in engagement with the driven member, and centrifugally actuated means for moving the clutch member axially against the pressure of the spring.

8. A speed governor comprising a driving shaft, a driven member rotatably carried thereby, a clutch member axially movable on the driving shaft, the end of said shaft being screw threaded and diametrically slotted, a leaf spring positioned in said slot with its ends bearing against the clutch member to normally hold the same in engagement with the driven member, a nut engaging the threaded end of said shaft and bearing against the leaf spring to vary the tension thereof, and centrifugally actuated means for moving the clutch member axially against the pressure of the spring.

In testimony whereof I hereunto set my hand in the presence of two subscribing witnesses.

FRANK L. SMITH.

In the presence of—
CARINA MUNRO,
CHARLES A. JACKSON.